United States Patent [19]

Shimizu

[11] Patent Number: 4,664,512
[45] Date of Patent: May 12, 1987

[54] THREE-DIMENSIONAL RANGE FINDER

[76] Inventor: Naoki Shimizu, 75, Midoricho 1-chome, Ogaki-Shi, Gifu-Ken, Japan

[21] Appl. No.: 689,054
[22] PCT Filed: Apr. 16, 1983
[86] PCT No.: PCT/JP83/00125
 § 371 Date: Dec. 14, 1984
 § 102(e) Date: Dec. 14, 1984
[87] PCT Pub. No.: WO84/04160
 PCT Pub. Date: Oct. 25, 1984
[51] Int. Cl.⁴ .......................... G01C 3/00; G03B 3/00
[52] U.S. Cl. ........................................ 356/1; 354/408
[58] Field of Search ............................. 356/1; 354/408

[56] References Cited
U.S. PATENT DOCUMENTS

| | | | |
|---|---|---|---|
| 3,274,914 | 9/1966 | Biedermann et al. | 354/408 |
| 3,945,023 | 3/1976 | Stauffer | 354/408 |
| 3,958,117 | 5/1976 | Stauffer . | |
| 4,078,171 | 3/1978 | Stauffer | 354/408 |
| 4,561,747 | 12/1985 | Ohno et al. | 354/408 |

FOREIGN PATENT DOCUMENTS 2142497 1/1985 United Kingdom ................ 354/408

Primary Examiner—Russell E. Adams
Attorney, Agent, or Firm—Schwartz, Jeffery, Schwaab, Mack, Blumenthal & Evans

[57] ABSTRACT

A range finder which measures positions in three-dimensional space of object points within a field of view. Pixel data outputted from pixels in different depths of focus are detected, while said depth of focus is moved. Pairs of pixel data, one outputted from each of two cameras, and which have the same value and each of which is different from pixel data outputted from pixels adjacent the pairs of pixel data are detected. Since the same object point forms its image in pairs of pixels, outputting the pairs of pixel data, permits the object range to be calculated from three factors as the interval between the two cameras, angle of two axes, and the positions of pixels in the two cameras.

12 Claims, 5 Drawing Figures

THREE-DIMENSIONAL RANGE FINDER

TECHNICAL FIELD

This invention is concerned with and intended for measuring the positions of points in three-dimensional space.

BACKGROUND ART

There are three prior techniques to which the invention is directed.

The first technique calculates the range from time lag in which light or acoustic wave is projected, reflected and received. Though it is easy to measure the range to one point by using this technique, it is difficult to measure ranges to many points in a short time.

The second technique picks up one point having characteristics in one image formed in one camera and another point having the same characteristics in another image formed in another camera, and calculates the ranged from these two points according to triangulation. Because it is difficult to determine the other point having the same characteristics, it is not easy to measure range by using this second technique.

The last technique projects a spot or a slit of light from one side, extracts the image of that spot or slit formed in a camera on another side, and calculates the range to the image according to triangulation while the spot or slit is moved. There remain such problems as the existence of points which cannot be reached by the spot or slit, as it is occasionally difficult to extract the image of the spot or slit because of round brightness, and as it is difficult to measure range with high accuracy because the spot or the slit has some area.

These three prior techniques are detailed in "Visual Sensor and Environmental Recognition" printed in monthly magazine "Sensor Technology" published in January of 1982 in Japan.

DISCLOSURE OF THE INVENTION

An object of the invention is to provide a range finder which can measure the positions in three-dimensional space of individual minute parts constituting an object.

The invention utilizes optical information outputted from each pixel of a camera in which the minute parts of the object form its image. If the range to these minute parts can be measured, the positions in three-dimensional space of these minute parts can be calculated because the direction to the minute parts can be determined by the position of the pixels in camera. For convenience in explanation, the minute parts of the object are referred to as object points, and the color information outputted from each pixel is referred to as a pixel datum.

In order to measure the range to the object point, the invention utilizes an object point whose optical information, or pixel datum outputted from the pixel in which said object point forms its image, is different from that of another object point accessing to the first said object point. The relationship between such a datum outputted or calculated from one pixel as said pixel, said pixel datum, and said object point is referred to as "corresponding to".

First, the object point forms its images in two pixels (one located in one camera and the other in the other camera) whose lens axes are not the same, the pixel data corresponding to which represent the same, and each is different from the pixels accessing to said two pixels. Then the range can be calculated from three factors such as the interval between the two lens axes, the angle of the two axes of the lens, and the two positions of said pixels in their repsetive cameras. The range finder of the invention can measure ranges to various object points by measuring some variable factors of the three while the other factors are fixed.

However, it is not efficient on the point of time to compare every two pixel data for every value of the variable factors. If there are some pixels the pixel data corresponding to which represent the same and are both different from other pixel data corresponding to other pixels accessing to said some pixels, it will be impossible to determine one range because a number of ranges are measured. Then, if the range finder has means for extracting only pixel data outputted from pixels in which the object points inside respective depths of focus of the lenses, which are moved, form their images, it will be efficient and will readily determine one range.

The following three methods of extracting pixel data outputted from pixels in which the object points inside respective depths of lens focus form their images may be considered. First is the method of extracting the pixel data whose contrast, or difference between said pixel datum and the other pixel datum outputted from the accessing pixel, represents a peak. Second is the method of extracting the pixel datum whose high-frequency part represents a peak. Third is the method of extracting the pixels in which two beams of light entering through two different exit pupils represent the same value.

The following effects are afforded by the use of the invention. The first effect is the possibility of measuring both one pixel datum constituting one image and the range to the object point which forms its image in the pixel outputting said pixel datum at the same time because the range is measured by the use of only pixel data. The second effect is the possibility of measuring every range at high speed regardless of complication in color information of the image because the object range is measured by every group of object points in each depth of focus of the lens. Third effect is the possibility of measuring every object range regardless of such condition of the object or nature of the object as high reflectivity and such positional relationship of the object as excessive range distance or obliqueness because the range can be measured by the use of only pixel data. The fourth effect is the possibility of measuring such characteristic factors of the object as length, angle, area, cubic volume, and shape by the use of the position in three-dimensional space measured by the invention. A further fifth effect is the provision of materials for determining the nature of an object and identifying each object.

BEST MODE OF CARRYING OUT THE INVENTION

Figure 1:
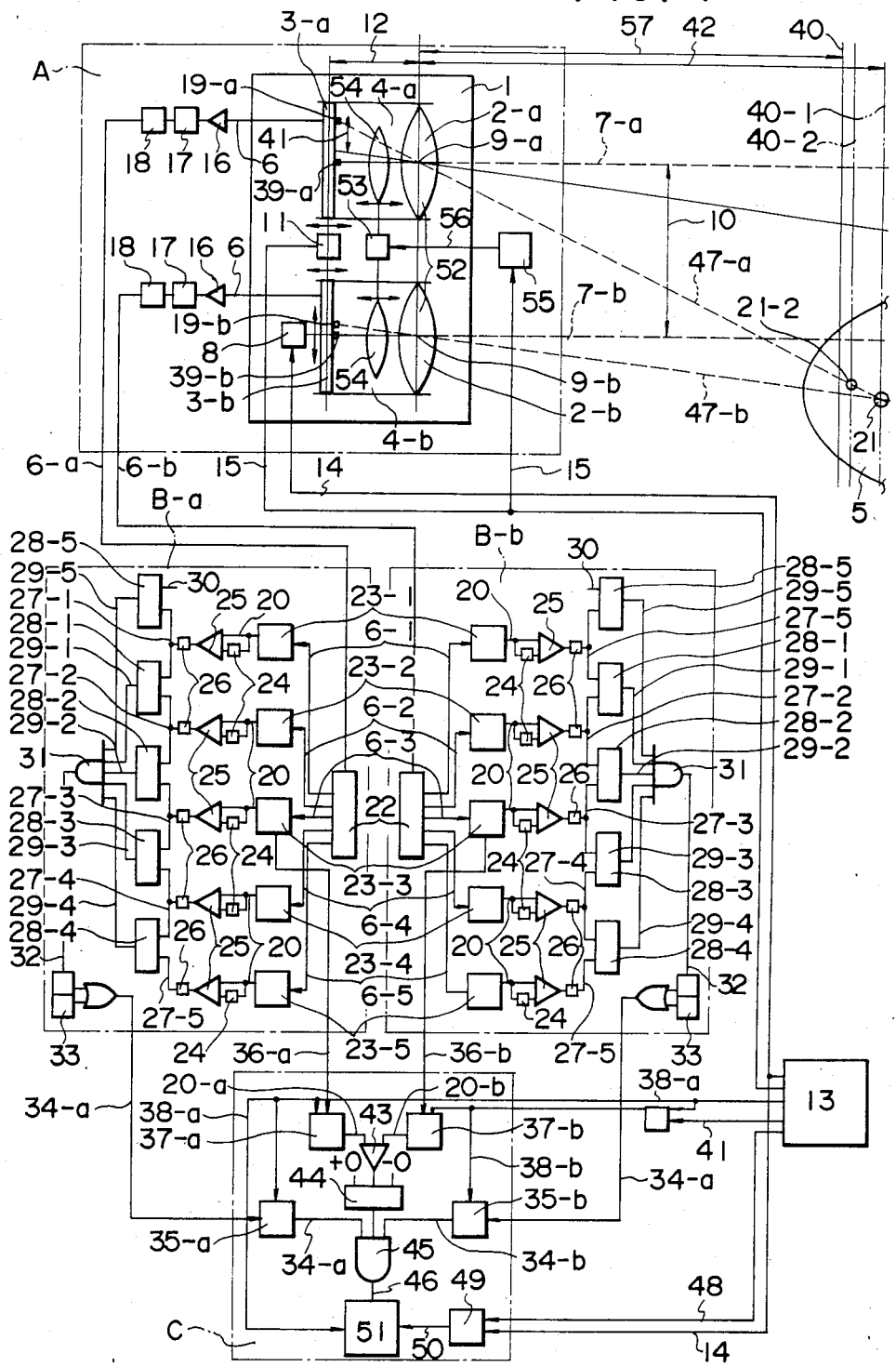
FIG. 1 is a plan view and electric circuit diagram indicating the "Best Mode of Carrying Out the Invention"

Referring first to the mode illustrated in FIG. 1, there is shown the structure of a camera section (A) which picks up visual information, i.e., optical information of an object as an image. On the main plane 1 of this camera section (A), there are two cameras 4-a, 4-b which have the same characteristics, i.e., lenses of the same focal length and image pickup elements 3-a, 3-b of the same resolution. In this mode, CCD 3 is used as an image pickup element 3. Images of the same object 5 are formed in each camera 4, from which each image signal 6 is outputted. The two lens axes 7-a, 7-b L of the cameras 4-a, 4-b are parallel. Both the line connecting the two centers of the lenses 2-a, 2-b (referred to as the standard line) and the line connecting the two centers of the CCDs 3-a, 3-b are at right angles with the axes of the lenses 7. One camera 4-a is fixed on the main plane 1, the other camera 4-b can be moved by a stepping motor 8 (referred to as the interval motor 8) on the main plate 1 along the standard line, in other words, this interval motor 8 can change the interval distance 10, i.e., the distance between the two centers of lenses 9 by a specific minute distance. However, the two axes of the lens 7 are always parallel. The two CCDs 3 can be moved simultaneously lens axis 7 by a stepping motor 11 (referred to as the camera motor 11). In other words, this camera motor 11 can change the image distance 12, i.e., the distance from CCD 3 to lens 2, by a specific minute distance. The interval motor 8 and the camera motor 11 are moved respectively according to interval datum 14 and distance datum 15, which are both outputted a Central Processing Unit 13 (referred to as CPU).

Each image signal 6-a, 6-b is amplified through a respective operating amplifier 16, and the peak value of this datum is held in a respective peak hold unit 17. These peak values are fed to focus extraction sections (B-a, B-b) described hereinafter, after being converted into digital form through A-D converters 18. (The image signal converted into digital form is newly referred to as image datum 6). Hereinafter each image datum 6 outputted from one pixel 19 constituting CCD 3 is referred to as pixel data 20, and the collection of all pixel data constituting one image datum 6 is newly referred to as image datum 6. The minute parts of the object 5 which form its image in each pixel 19 is referred to an object point 21, and the relationship between such data outputted or calculated from one pixel 19 as the pixel 19, the pixel data 20, the object point 21 and so on is referred to as "corresponding to".

Referring to FIG. 1 again, there is shown a structure of focus extraction sections (B-a, B-b). These sections extract the pixel data 20 outputted from the pixels 19 in which the object points 21 at a particular depth of focus of the lens form their images when CCDs 3 are disposed at a standard position (hereinafter defined). The operation in these sections (B) will now be described step by step.

After the CCD 3 is moved into a first position by the camera motor 11 according to distance datum 15, a first image datum 6-1 outputted from the CCD 3 is stored in an image memory 23-1 which is selected by a multiplexer 22. The image memory 23 is composed of many memory cells, one of which corresponds to each pixel 19. Other memories hereinafter defined are also each composed of many memory cells. Next, after CCD 3 is moved into a second position, which is separated by a specific minute distance from the first position in a specific direction by the camera motor 11, a second image datum 6-2 is stored in an image memory 23-2. Again after CCD 3 is moved into a third position, which is separated by the same specific minute distance from the second position in the same direction, a third image datum 6-3 is stored in an image memory 23-3. The above-described operation is repeated two more times, and an image datum 6-4 in the fourth position and an image datum 6-5 in the fifth position are stored respectively in an image memory 23-4 and an image memory 23-5. The third position which is at the center of the five positions is referred to as the standard position.

Pixel data 20 constituting one image datum 6 are outputted from the image memories 23 in the order from the pixel datum 20 of the pixel 19 at the left end to the pixel datum 20 of the pixel 19 at the right end, and from the top collection of pixels 19 constituting one level line to the bottom collection (referred to as the standard order). Five pixel data 20 from each image memory 23 are outputted simultaneously. Each pixel datum 20 is fed to both of a pixel data register 24 and a subtractor 25. Another pixel datum 20 registered previously in the same pixel data register 24, i.e., outputted from the other pixel 19 just on the left side to the pixel 19 outputting the new pixel datum 20 is simultaneously fed to this subtractor 25, from which is outputted a contrast datum 27 representing the balance of two pixel data 20, after being converted into absolute value through an absolute value converter 26. The contrast datum 27 calculated from the two pixel data 20 constituting an image datum 6-1 is referred to as contrast datum 27-1. Similarly, the contrast datum 27 calculated from the two pixel data 20 constituting an image datum 6-2, image datum 6-3, image datum 6-4 and image datum 6-5 are respectively referred to as contrast datum 27-2, contrast datum 27-3, contrast datum 27-4 and contrast datum 27-5.

Contrast datum 27-1 and contrast datum 27-2 are fed to a comparator 28-1, from which a comparison datum 29-1 is outputted. This comparison datum 29-1, which is digital, represents "1" when the contrast datum 27-2 is greater than the contrast datum 27-1. Similarly, a comparison datum 29-2 outputted from a comparator 28-2 represents "1" when a contrast datum 27-3 is greater than the contrast datum 27-2, and a comparison datum 29-3 outputted from a comparator 28-3 represents "1" when the contrast datum 27-3 is greater than a contrast datum 27-4, and a comparison datum 29-4 outputted from a comparator 28-4 represents "1" when the contrast datum 27-4 is greater than a contrast datum 27-5. The contrast datum 27-1 is also fed together with a minimum datum 30 to a comparator 28-5, from which a comparison datum 29-5 is outputted. This comparison datum 29-5 represents "1" when the contrast datum 27-1 is greater than the minimum datum 30. These five comparison data 29 are fed to an AND circuit 31, from which a focus datum 32 is outputted.

This focus datum 32 represents "1" when all of the five comparison data 27 represent "1". This focus datum 32 is fed to a digital shift register 33 having one input and two parallel outputs. These two parallel outputs are fed to an OR circuit, from which a focus pixel datum 34 is outputted. This focus pixel datum 34 represents "1" the pixel 19 the contrast datum 27 corresponding to which represents a peak, i.e., which are in focus, and the pixel datum 20 corresponding to which is different from the one corresponding to other pixel 19 access the first said pixel 19.

The reasons why focus extraction sections (B) perform the above described operations are as follows. The first reason is as follows. The contrast of two pixel data 20 corresponding to each object point 21 adjacent each other, which is just in focus, represents a peak. This rule is applied in focus extraction sections (B). Contrast is assumed to represent a peak when contrast datum 27 outputted from the CCD 3 located nearer to the standard position is greater than contrast datum 27 outputted from the CCD 3 located further from the standard position. In other words, the "1" of focus pixel datum 34 means that the contrast of optical information of the object point 21 corresponding to said focus pixel datum 34 is not "0" and represents the peak. The reason for using five contrast data 27 in order to extract the contrast datum 27 representing the peak is to prevent the extracting of the contrast datum 27 the object point 21 corresponding to which is not in focus and which has contrast only because of image vignette, though there is really no contrast. The image of the object point 21 has no contrast when it is within the depth of focus of the lens while the contrast becomes great when the object point 21 is farther from the depth of focus of the lens. Therefore, five contrast data 27 are used so that the focus pixel datum 34 will not represent "1" when two of the five represent peaks.

Next referring to the coincidence section (C), focus pixel datum 34-a outputted from the focus extraction section (B-a) is stored in the focus memory 35-a, and focus pixel datum 34-b outputted from the focus extraction section (B-b) is stored in the focus memory 35-b. Also image datum 6-3 outputted from the focus extraction section (B-a) (newly referred to as standard image datum 36-a) is stored in the standard image memory 37-a, and image datum 6-3 outputted from the focus extraction section (B-b) (newly referred to as standard image datum 36-b) is stored in the standard image memory 37-b. In each focus extraction section (B-a, B-b), both one pixel datum 20 of standard image datum 36 and focus pixel datum 34 corresponding to this pixel datum 20 can be accessed by the same address datum 38. The pixels in which the axes of the lens 7-a, 7-b cross with each CCD 3-a, 3-b are referred to as standard pixels 39-a, 39-b. The two pixel data 20 from the pixels 19 located in optically the same positions in each CCD 3-a, 3-b are accessed by the same address datum 38.

Now coming back to the camera section (A), there is the interval distance 10 between the two cameras 4-a, 4-b. There is a common field between the two fields of view of the cameras 4-a, 4-b. The object in this common field forms its images in the two CCDs 3. For example, one plane parallel to lens 2 (referred to as object plane 40-1) is located in the depth of focus of the lens. One object point 21 in this object plane 40-1 is located in this common field. Two pixels 19-a, 19-b of respective CCD 3-a, 3-b in which this object point 21-1 forms its images are located in optically different positions from respective standard pixels 39-a, 39-b, especially in positions along the standard line. This difference is caused by the interval distance 10 between the two cameras 4-a, 4-b. Furthermore, the same difference is caused between every two pixels 19 the object point 21 corresponding to which is located in the same object plane 40-1. Conversely, if a pixel datum 20-a from the pixel 19-a of the CCD 3-a and a pixel datum 20-b from the pixel 19-b of the CCD 3-b which is apart by this difference from pixel 19-a are outputted simultaneously, every two pixel data 20 from pixels 19 in which the same object point 21 in the object plane 40-1 forms its images are outputted simultaneously. After the interval distance 10 is changed by a fixed minute distance, two pixel data 20 from pixels 19 in which the other object point 21 in the other plane 19-b, which is apart by a fixed minute distance from the previous object plane 19-a, forms its images are outputted simultaneously.

By utilizing this rule conversely, it becomes possible to measure the range from the lens 2 to each object point 21 (referred to as object range 42) in the coincidence section (C). First the pixel datum 20-a and the focus pixel datum 34-a corresponding to this pixel datum 20-a, which are stored in respective memory cells accessed by one address datum 38-a, are outputted simultaneously together with pixel datum 20-b and the focus pixel datum 34-b accessed by the other address datum 38-b which is made by adding a number meaning some pixels of said difference to the address datum 38-a, i.e., by the other address datum 38-b accessing the other pixel 19 apart by some pixels from the pixel 19 accessed by address datum 38-a. The two pixel data 20-a, 20-b are fed to a subtractor 43, the output from which is then fed to a wind on comparator 44 together with two comparison data, or "+0" and "−0". The output from this wind on comparator 44 represents "1" only when the output from the subtractor 43 is substantially zero, i.e. when two pixel data 20 coincide within the range of error. The output from this wind on comparator 44 is fed together with two focus pixel data 34-a, 34-b to an AND circuit 45, the output from which (referred to as coincidence datum 46) represents "1" only when all these three data represent "1". In other words, this coincidence data 46 represents "1" only when pixel data 20 and focus datum 34 are simultaneously outputted from the two pixels 19 of each CCD 3 in which the same object point 21 having different optical information from the other object point 21 accessing to said object point 21 forms its images, i.e., when there is a difference (referred to as gap pixels 41) between two optical positions of said two pixels 19.

It is understood that, if the coincidence data 46 represents "1" in the above operation, there is one object point 21 at which one line connecting pixel 19-a and the center of the lens 9-a (referred to as pixel line 47-a) and the other line connecting pixel 19-b and the center of the lens 9-b (referred to as pixel line 47-b) cross. One pixel line 47-b is moved in parallel according to variation of the interval distance 10 by the interval motor 8. When the image distance 12 from the lens 2 to the CCD 3 is referred to as "Q", the distance equal to the gap pixels 41 is referred to as "A", and the interval distance 10 is referred to as "B", the distance "P" from the standard lens 2-a to the crossing point of the two pixel lines 47-a, 47-b is defined by the following equation.

$$P = \frac{1}{A} \cdot B \cdot Q \qquad \text{(Eq. 1)}$$

This equation means that the object range 42 can be calculated from the interval distance 10 and the image distance 12 when the gap pixels 41 are fixed. The interval datum 14 representing the interval distance 10 and image distance datum 48 representing the image distance 12 are fed from the CPU 13 to a range calculator 49, in which the object range 42 is calculated in accordance to formula 1. The object range 42 to each object point 21 which forms its image in the pixel 19-a accessed by the address datum 38-a can be measured by storing the object range 42 in a memory cell of a range memory 51 accessed by the address datum 38-a when the coincidence datum 46 represents "1".

After all of the above operations have been performed with regard to all combinations of two pixel data 20 for which all of the above operations can be performed, i.e., which is stored in the memory cell accessable by the address datum 38-a and the address datum 38-b, the two CCDs 3 are moved back to the first position in which the image datum 6-1 is outputted, and the camera 4-b is moved along the standard line to a new position which is spaced apart from the previous position by a fixed minute distance. Five new image data 6 outputted from the CCDs 3 located in the same respective positions as in the previous operation are stored in five memories 23, and the operations of the focus extraction section (B) and the coincidence section (C) are performed. Only when the object point 21, the object range 42 to which is measured by finding two coinciding pixels 19 goes outside the depth of focus of the lens, the five positions of the CCD 3 are moved to five new positions, and five new image data 6 are stored in five image memories 23. Thereafter the same operations of the focus extraction section (B) and the coincidence section (C) are repeated.

The significance of and reasons for the above described series of operation will now be considered. One object point 5 forms its image on two CCDs 3. The interval distance 10 must be varied in accordance with the object range 42 to each object point 21 constituting one object 15 in order that every object point 21 forms its image on two pixels 19 of each CCD 3 which are space apart by a fixed minute distance from each other. Conversely, the object range 42 can be calculated from the interval distance 10. However, it is impossible to measure every object range 42 to each object point 21 inside the angle of view at one time, i.e., to investigate at one time if every combination of two pixel data 20 coincide or not, because the scope in which interval distance 10 is varied is too great. Then if every collection of pixel datum 20 outputted from all pixels 19 in which the object point 21 inside each depth of focus of the lens form its image is investigated as to whether each combination of two pixel data 20 coincides or not, it is easier to measure the object range 42, because the scope of the interval distance 10 becomes smaller.

The case where some object points 21, which have the same optical information, constitute one part of the object 5 will now be considered. When it is investigated as to which pixel datum 20 from CCD's pixels one pixel datum 20 from one of CCD 3-a's pixels corresponding to such object points 21 coincides to coincidence data 46 represents "1" in some cases of some variable interval distances 10, equally it is impossible to determine the object range 42 to the object point 21 corresponding to said one pixel datum 20. The investigating only two pixel data 20 which are different from the pixel datum 20 outputted from accessing pixel 19 provide an easier way to determine one object range 42. Because of these two reasons, it is suitable to combine two focus extraction sections (B) and one coincidence section (C).

Furthermore, there are cases wherein the approximate position of the object 5 the object range 42 which to the object points 21 constituting the object is known, or wherein the spatial scope the object range of which should be investigated has been determined beforehand. An approximate position or a constant spatial scope can be indicated by the two object planes 40 between which it is interposed. Furthermore, if the distance between the lens plane of the lens 2a, which is the standard or reference plane, and the object plane 40 is taken as the object distance 57, it can be expressed by two object distances 57. In the case where the object distance 57 is known, the object range 42 corresponding thereto, that is, the object range 42 which is the distance between the lens 2 and the CCD 3 when this object distance 57 has such a positional relationship that the object distance includes the indicated object plane 40 within the focal range, can be determined.

Furthermore, the interval distance 10, designated by B, corresponding to the object distance 56 can be determined from the following Eq. 2 in terms of Q, the object range 42 thus determined, P, the object distance 57 which is the basis thereof, and A, the distance of the constant gap pixel 41.

$$B = \frac{A \cdot P}{Q} \qquad \text{(Eq. 2)}$$

Then, in the case where the scope of investigation of the object range 42 as described above has been determined, the processes in the extraction section B and the coincidence section C are carried out by determining two interval distances 10 corresponding to the object planes 40 defining the limits of this scope by a calculation based on Eq. 2 in the central processing unit 13 and outputting only the interval datum 14 which commands the interval distance 10 included between the two interval distances 10 thus determined.

In the above described mode, the combination of two pixels 19 of each CCD 3 which form images of the same object point 21 can be extracted while the interval distance 10 is changed. The same combination can be extracted by two other ways.

Figure 2:
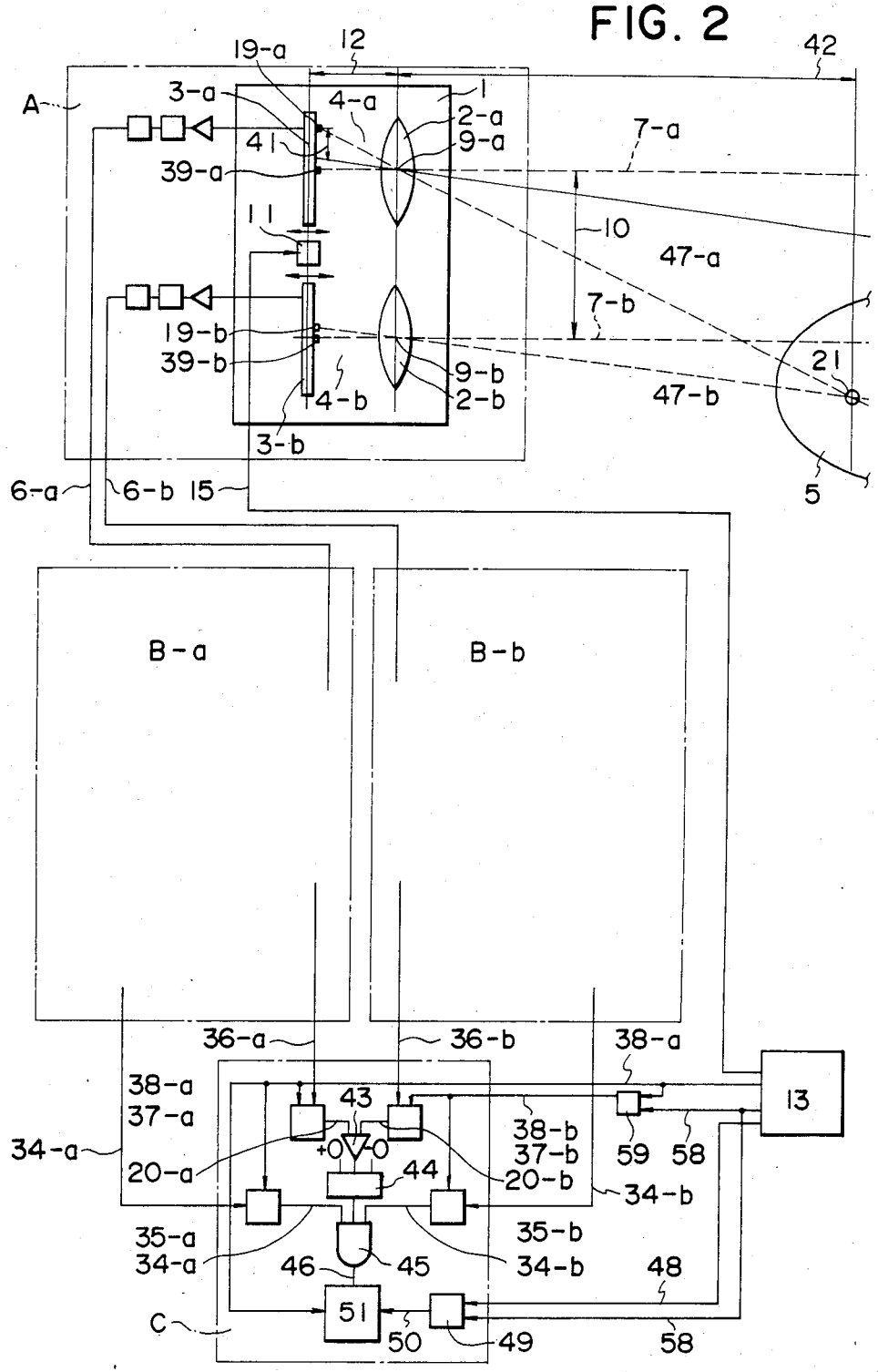
FIG. 2 is a plan view and electric circuit diagram of the mode of measuring range from variable gap pixels.

As illustrated in FIG. 2 showing one way, the combination of two pixels 19 of each CCD 3 which form its images of the same object point 21 can be extracted while the gap pixel 41 is varied, and while the interval distance 10 is fixed.

Figure 3:
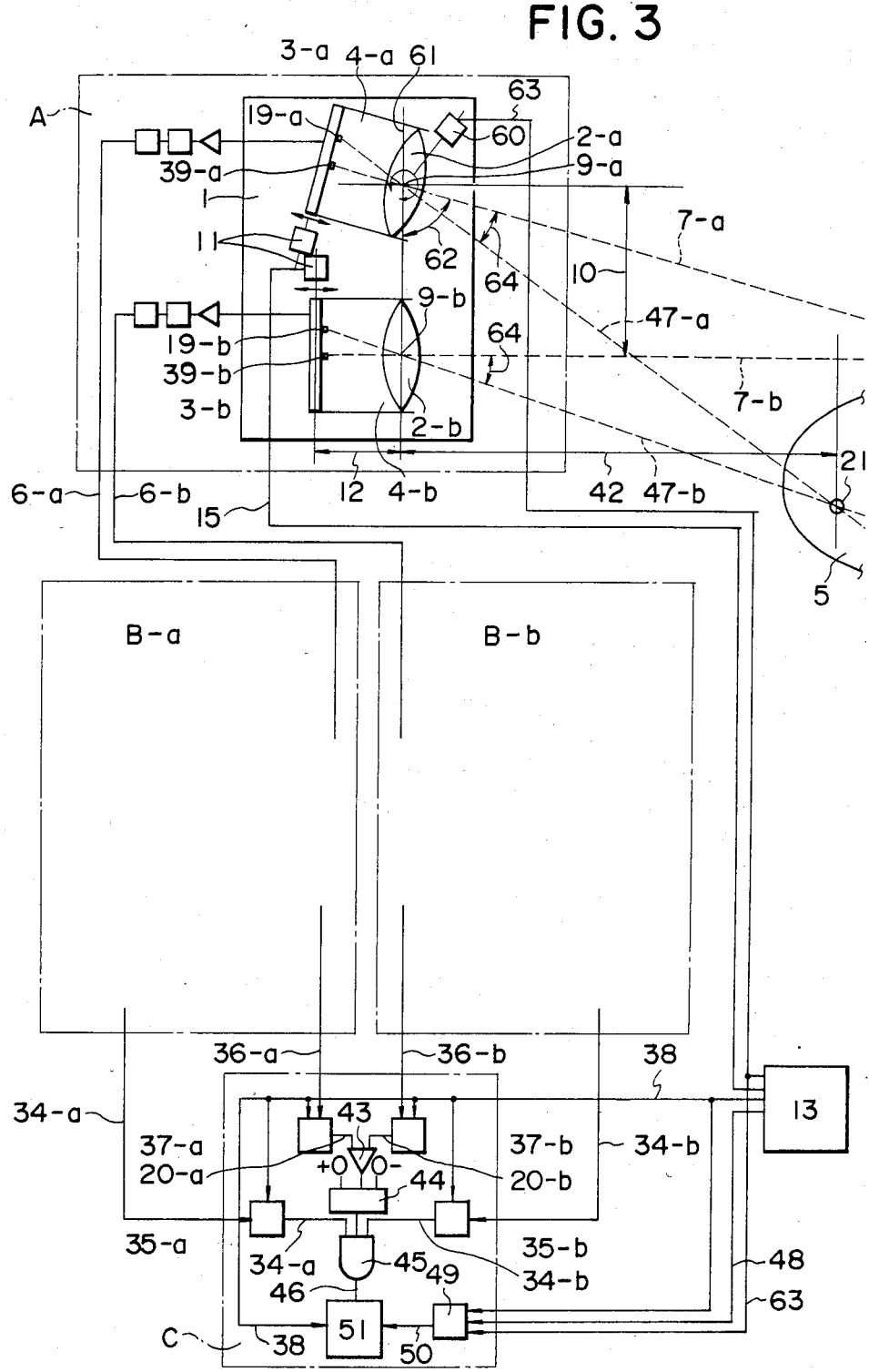
FIG. 3 is a plan view and electric circuit diagram of the mode of measuring range from camera angle.

As illustrated in FIG. 3 showing the other way, the combination of two pixels 19 of each CCD 3 which form its images of the same object point 21 can be extracted while the angle between the axes of the lens 7 and the standard line are varied, and while the interval distance 10 and the gap pixels 41 are fixed.

Referring to FIG. 2, showing the first way, two cameras 4-a, 4-b of same characteristics are fixed in the horizontal main plane 1 so that the two optical axes of the lens of these cameras are parallel. Then the interval distance 10 between the two centers 9-a, 9-b is always a fixed value. In the two cameras 4, the CCDs 3 can be moved simultaneously along the axes of the lenses by the camera motor 11. In other words, this camera motor 11 can vary the image distance 12 by a fixed distance. The camera motor 11 is operated according to a distance datum 15 which is outputted from the CPU.

The same action in the focus extraction section (B) of the mode described in conjunction with FIG. 1 is performed with regard to image signals 6-a, 6-b, and this section (B) outputs a focus pixel datum 34 representing the pixel 19 in which the object point 21 in the depth of focus of the lens forms its image, the pixel datum 20 corresponding to which being different from the one corresponding to the accessing pixel 19. Two focus pixel data 34-a, 34-b are stored in the coincidence section (C) together with standard image data 36a, 36-b.

Two pixels 19-a, 19-b respectively of CCD 3-a, 3-b in which the same object point 21-1 forms its images are located in optically different positions from the standard pixels 39-a, 39-b, especially in the positions different along the standard line. When this difference or gap pixel 41 is referred to as "A", the fixed interval distance 10 is referred to as "B", and the image distance is referred to as "Q", the object range "P" from the lens 2 to the object point 21 is represented as in the aforementioned Eq. 1.

This Equation 1 means that the object range 42 to each object point 21 is determined by the gap pixel 41 while the interval distance 10 is fixed, and while the image distance is assumed to be fixed. The object range 42 can be measured by calculating from the gap pixel 41 between two pixels 19 in which the same object point 21 forms its images.

In the coincidence section (C), focus pixel data 34-a, 34-b outputted from the focus extraction sections (B-a, B-b) are stored in respective focus memories 35-a, 35-b, and standard image data 36-a, 36-b outputted from the focus extraction sections (B-a, B-b) are stored in respective standard image memories 37-a, 37-b. One pixel datum 20-a and one focus pixel datum 34-a corresponding to one pixel 19-a in one CCD 3-a are outputted from a respective memory cell accessed by one address datum 38-a. This address datum 38-a and gap pixels datum 58 representing the number of gap pixels 41 are added in adder 59, from which the other address datum 38-b is outputted. The other pixel datum 20-b and the other focus pixel datum 34-b corresponding to the other pixel 19-b are outputted from each memory cell accessed by said other address datum 38-b. The same operation in the coincidence section (C) of the mode described with reference to FIG. 1 is performed with regard to these four data. Finally, the coincidence datum 46 representing the combination of two pixels is outputted, one located in one CCD 3-a and the other in the other CCD 3-b, in which the same object point 21 forms its images, and the pixel datum 20 corresponding to which is different from the one corresponding to other pixels 19 accessing to said two pixels 19.

The interval distance 10, image distance 12 and gap pixels datum 58 are fed to the range calculator 49, in which an object range datum 50 representing the object range 42 is calculated according to Eq. 1. Only when the coincidence datum 46 represents "1", this object range datum 50 is stored in the memory cell of the range memory 51 accessed by address datum 38-a.

After the above operation has been performed with regard to all combinations of two pixel data 20, "1" meaning one pixel 19 is added to both gap pixels data 50, which represent the number of the gap pixels 41, and the address datum 38-b. In other words, the same pixel 19-a in the previous operation is accessed by the address datum 38-a, and at the same time a new pixel 19-c accessing to the pixel 19-b in the previous operation is accessed by a new address datum 38-b. The above action is repeated with regard to the combination of a pixel datum 36 and focus pixel datum 34 accessed by the address datum 38-a and pixel datum 36 and focus pixel datum 34 accessed by this new address datum 38-b. Only when the object point 21, the coincidence datum 46 corresponding to which should represent "1", goes outside of the depth of focus of the lens, CCDs 3-a, 3-b are moved to new first position. A new image datum 6-1 in this new first position is stored in the image memory 23-1, and similarly four other new image data 6 in each new position are stored in each image memory 25. Thereafter the same operations in the focus extraction section (B) and the coincidence section (C) are repeated.

Referring to the other way of the two ways described above with reference to FIG. 3, two cameras 4-a, 4-b of the same characteristics are fixed in the main plane 1, the two axes of their lenses 7-a, 7-b being in one plane. Then the interval distance 10 between the two centers 9-a, 9-b is constantly a fixed value. One axis of the lens 7-a of the camera 4-a can be rotated around the center of the lens 9-a by a stepping motor 60 (referred to as rotation motor 60). In other words, this rotation motor 60 can vary the angle between the standard line and the axis of the lens 7-a (referred to as camera angle 62) by a fixed minute angle. The rotation motor 60 rotates the camera 9-a according to a camera angle datum 63, which is outputted from the CPU 13. The axis of the lens 7-b of the other fixed camera 4-b is at right angles with the standard line 61. In the two cameras 4-a, 4-b, the CCDs 3 can be moved simultaneously along the axes of the lenses 7 by camera motors 11. In other words, these camera motors 11 can vary the image distance 12 by a fixed minute distance. The camera motors 11 are moved according to the distance datum 15, which is outputted from the CPU 13.

The same operation in the focus extraction section (B) of the mode described in conjunction with FIG. 1 is performed with regard to image signals 6-a, 6-b. This section (B) outputs a focus pixel datum 34 representing the pixel 19 in which the object point 21 in the depth of focus of the lens forms its image, and the pixel datum 20 corresponding thereto is different from the other pixel datum 20 outputted from the other pixel 19 accessing to said pixel 19. Two focus pixel data 34-a, 34-b are stored in the coincidence section (C) together with standard image data 36-a, 36-b.

A combination of two pixels 9-a, 9-b, one located in CCD 3-a and the other is CCD 3-b, is in optically the same positions from the standard pixels 39-a, 39-b. A line connecting the pixel 19-a and the center of the lens 9-a (referred to as pixel line 47-a) and a line connecting the pixel 19-a and the center of the lens 9-b (referred to as pixel line 47-b) intersect at one point. When the angle between the pixel line 47-a and the axis of the lens 7-a, equally the angle between the pixel line 47-a and the axis of the lens 7-a (referred to as pixel angle 64), is referred to as "X", the camera angle 62 is referred to as "V", and the interval distance 10 is referred to as "B", the range "P" from the lens 2 to the intersection point of the two pixel lines 47-a, 47-b is represented by the following Eq. 3:

$$P = \frac{B}{-\tan X + \tan(90 + X - Y)} \quad \text{(Eq. 3)}$$

If one object point 21 exists at the intersection of the two pixel lines 47-a, 47-b, the object range 42 to that object point 21 is represented by Eq. 4. In other words, the object range 42 is determined by the camera angle 62 when the pixel angle 64 and the interval distance 10 are fixed. By extracting the combinations of the two pixels in which the same object point forms its images, it is possible to measure the camera angle 62 and, moreover, the object range 42 corresponding to that object point 21. In other words, by extracting the combinations of two pixel data 20 which have the same value, and which are each different from the one corresponding to the other accessing pixel 19, it is possible to measure the object range 42. The foregoing description is that of the operational principle of the coincidence section (C).

In this coincidence section (C), focus pixel data 34-a, 34-b outputted from the focus extraction sections (B-a, B-b) are stored in respective focus memories 35-a, 35-b, and standard image data 36-a, 36-b outputted from the focus extraction sections (B-a, B-b) are stored in respective standard image memories 37-a, 37-b. One pixel datum 20-a and one focus pixel datum 34-a corresponding to one pixel 19-a in one CCD 3-a are outputted from each memory cell accessed by one address datum 38. Simultaneously, the other pixel datum 20-b and the other focus pixel datum 34-b corresponding to the other pixel 19-b in the other CCD 3-b are outputted from each memory cell accessed by the same address data 38. The same process in the coincidence section (C) of the mode described in conjunction with FIG. 1 is carried out with regard to these four data. Finally, the coincident datum 46 is outputted to represent the combination of two pixels (one located in CCD 3-a, the other in CCD 3-b) in which the same object point 21 forms its images, the pixel datum 20 corresponding to which is different from the one corresponding to the accessing pixel 19.

The interval distance 10, the camera angle datum 63, and the address datum 38, representing the pixel angle 64 of the two pixels 19, are fed to a range calculator 49, in which the object range datum 50 representing the object range 42 is calculated according to Eq. 3. Only when the coincidence datum 46 represents "1", this object range datum 50 is stored in a memory cell of the range memory 51 accessed by the same address datum 38.

After the above described operation of the coincidence section (C) has been performed with regard to all combinations of two pixel data 20, the camera 4-a is rotated by a specific minute angle according to variation of the camera angle datum 63. In the focus extraction section (B-a), five new image data 6-a outputted from CCD 3-a located in the same five positions in the previous operation are stored in five image memories 23. Then the above operation is repeated with regard to all combinations of two pixel data 20 and two focus pixel data 34. Only when the object point 21, the coincidence data 46 corresponding to which should represent "1", goes outside the depth of focus of the lens, the CCDs 3-a, 3-b are moved to new first positions. The new image datum 6-1 in this new first position is stored in the image memory 23-1, and similarly the four other new image data 6 in respective new positions are stored in respective image memories 25. Thereafter the same operations in the focus extraction section (B) and the coincidence section (C) are repeated.

Furthermore, in the mode described in conjunction with FIG. 1, the pixel 19 of each CCD 3 forming the image of the object point 21 which exists within the depth of focus of the lens and the pixel datum 20 corresponding to which is different from the other pixel datum 20 corresponding to the other pixel 19 accessing to said pixel 20 can be extracted by seeking the peak value of the contrast datum 27. The same pixel 19 can be extracted by two other ways.

Figure 4:
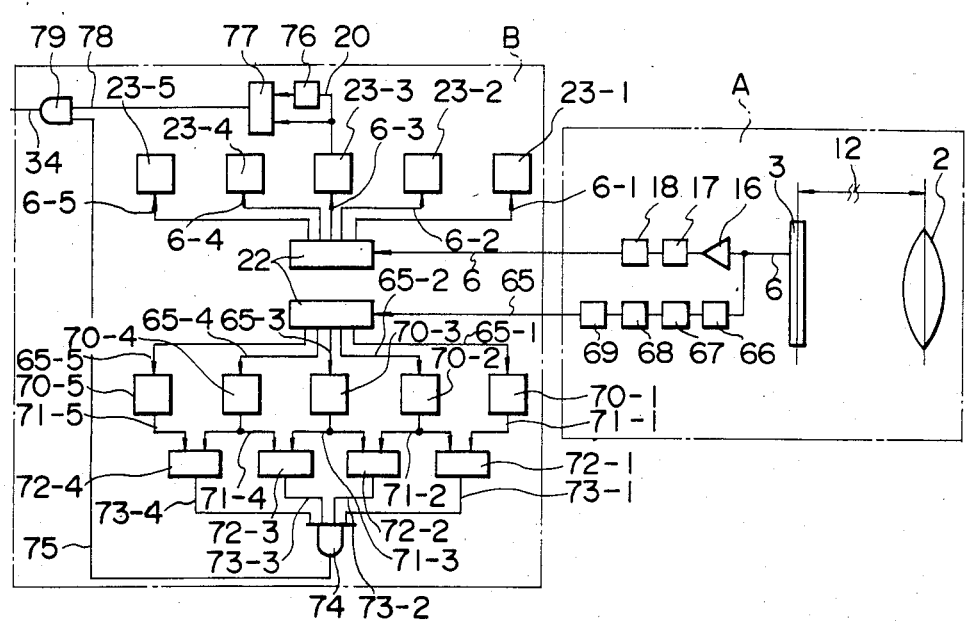
FIG. 4 is a plan view and electric circuit diagram of the mode of extracting object points within depth of focus of the lens from high-frequency part.

As indicated in FIG. 4, one way of the two is a method in which instead of the contrast datum 27 in the example of FIG. 1, the high-frequency datum 65 representing the high-frequency part contained in the pixel signal 20 is compared, and the pixel 19 indicating a peak is detected or extracted.

In the camera section (A), MOS image sensors 3-a, 3-b are utilized as the image pickup element 3. Each of the image signals 6-a, 6-b outputted from these MOS image sensors 6 is divided into two, and one of the two is converted into a digital form and stored in a respective image memory 23 in the same way as in the mode described in connection with FIG. 1.

High-frequency parts in the other image signals 6-a, 6-b are extracted through high-pass filters 66 and are demodulated through demodulators 67, and the peak values of these high frequency parts are held in peak hold circuits 68. These peak values are converted into digital forms through A-D converters 69 and are stored in respective high-frequency memories 70 in focus extraction sections (B-a, B-b). Hereinafter each peak value calculated from one pixel signal 20 is referred to as pixel high-frequency datum 71.

Similarly as in the mode described with reference to FIG. 1, in each of the focus extraction sections (B-a, B-b), five image data 6-1, 6-2, 6-3, 6-4, 6-5 outputted from the MOS image sensor 3-a, 3-b located in five positions which are different by a specific minute distance are stored in respective image memories 23-1, 23-2, 23-3, 23-4, 23-5. Also, five high-frequency data 65-1, 65-2, 65-3, 65-4, 65-5 calculated from image signals 6-1, 6-2, 6-3, 6-4, 6-5 are stored in respective high-frequency memories 70-1, 70-2, 70-3, 70-4, 70-5. An image datum 6-3 outputted when the MOS image sensor 3 located in the central position of the five is referred to as standard image datum 6-3, and the high-frequency datum 65-3 calculated from this standard image datum 6-3 is referred to as standard high-frequency datum 65-3. The high-frequency datum 65 contained in each pixel signal 20 is referred to as pixel high-frequency datum 71. A pair out of the five pixel high-frequency data 71-1, 71-2, 71-3, 71-4, 71-5 corresponding to the same pixel 19 is outputted simultaneously in the same standard order as the pixel datum 20 is outputted as in the mode described in conjunction with FIG. 1. The same operation as in the mode described with reference to FIG. 1 is performed with regard to these five pixel high-frequency data 71 in place of the contrast data 27.

More specifically, the pixel high-frequency datum 71-1 and pixel high-frequency datum 71-2 are fed to a comparator 72-1, from which a comparison datum 73-1 is outputted. This comparison datum 73-1, which is digital, represents "1" when the pixel high-frequency datum 71-2 is greater than the pixel high-frequency datum 71-1. Similarly, the comparison datum 73-2 outputted from the comparator 72-2 represents "1" when the pixel high-frequency datum 71-3 is greater than the pixel high-frequency datum 71-2, and the comparison datum 73-3 outputted from the comparator 72-3 represents "1" when the pixel high-frequency datum 71-3 is greater than the pixel high-frequency datum 71-4. Further, the comparison datum 73-4 outputted from the comparator 72-4 represents "1" when the pixel high-frequency datum 71-4 is greater than the pixel high-frequency datum 71-5.

These four comparison data 73 are fed to an AND circuit 74, from which a focus datum 75 is outputted. This focus datum 75 represents "1" when all of four comparison data 73 are "1". This "1" in the focus datum 75 means that the pixel 19, the high-fequency part contained in the pixel signal 20 corresponding to which, represents a peak, i.e., the pixel 19 the object point 21 corresponding to which is within the depth of focus of the lens when the MOS image sensor 3 is located in the central position of the five.

The pixel datum 20 constituting the standard image datum 36 is divided into two and fed to both the pixel data register 76 and the comparator 77. The pixel datum 20 registered previously in the same pixel data register 77, i.e., outputted from the other pixel 19 located just to the left of the pixel 19 outputting said pixel datum 20 is simultaneously fed to this comparator 77, from which a balance datum 78 is outputted. This balance datum 78, which is in digital form, represents "1" only when there is some balance between said pixel datum 20 and the pixel datum 20 registered previously.

This balance datum 75 is fed together with the focus datum 75 to an AND circuit 79, from which the focus pixel datum 34 is outputted. This focus pixel datum 34 represents "1" when both of the two data represent "1". In other words, this focus pixel datum 34 represents as "1" the pixel 19 in which the object point 21 in the depth of focus of the lens forms its image, and the pixel datum 20 corresponding to which is different from the one corresponding to the other pixel accessing to said pixel 19.

Figure 5:
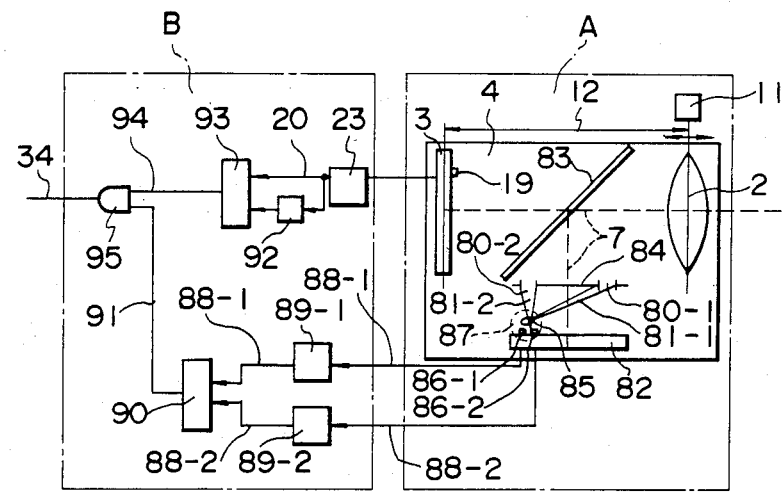
FIG. 5 is a plan view and electric circuit diagram of the mode of extracting object points within the depth of focus of the lens by the use of a TCL sensor.

As illustrated in FIG. 5, the other of the aforementioned two ways is a method which comprises measuring the phase difference between two images formed by two beams of light which enter through respective exit pupils 80 of optically different positions and extracting the pixels 19 in which two pixel data 20 from respective beams of light have same value, i.e., in which the phase difference between the two beams of light is zero.

In each of the cameras 4-a, 4-b, between the lens 2 and the CCD 3 there is a half-mirror 83, through which the light from the lens 2 is divided into two light beams. One divided light beam forms its image in the CCD 3. The other divided light beam passes through two exit pupils 80-1, 80-2 which are symmetrical with respect to the axis of the lens 7 in one exit pupil plate 84. The two beams of light passing through these exit pupils 80 form respective images in a TCL sensor 82, which is optically in the same position as the CCD 3. The TCL sensor 82 is provided with several detecting modules 87 each comprising one minute lens 85 and two photoelectric elements 86-1, 86-2. One beam of light 81-1 enters one photoelectric element 86-1, from which a photoelectric datum 88-1 is outputted. This photoelectric datum 88-1 represents the optical information of the beam of light 81-1. Similarly, the other beam of light 81-2 enters the other photoelectric element 86-2, from which another photoelectric datum 88-2 is outputted. This photoelectric datum 88-2 represents the optical information of the beam of light 81-2. The photoelectric elements 86 and the pixels 19 constituting the CCD 3 have a one-to-one correspondence, and one photoelectric element 86 and one pixel 19 corresponding to the photoelectric element 81 are located optically in the same position. In the two cameras 4, the lenses 2 can be moved simultaneously along the axis of the lens 7 by the stepping motor 11 (referred to as camera motor 11). In other words, this camera motor 11 can change the image distance 12, i.e., the distance from the lenses 2 to the CCDs 3, and also to the TCL sensors 82.

When the lens 2 is in one position, the image signal 6 outputted from the CCD 3 is converted into digital form and is stored in the image memory 23. Two photoelectric data 88-1, 88-2 outputted from respective photoelectric elements 86-1, 86-2 are converted into digital form and are stored in respective photoelectric memories 89-1, 89-2.

A pair of pixel data 20 from one pixel 19 and two photoelectric data 88-1, 88-2 from the detecting module 87 located optically in the same position of said pixel 19 are outputted simultaneously in the same standard order as the pixel data 20 outputted in the mode described in conjunction with FIG. 1. A photoelectric datum 88-1 and a photoelectric datum 88-2 are fed to a coincidence circuit 90, from which a focus datum 91 is outputted. This focus datum 91, which is in digital form, represents "1" when the two photoelectric data 88-1, 88-2 have the same value. In other words, this focus datum 91 represents as "1" the detecting module 87 in which an object point 21 within the depth of focus of the lens forms its image.

The pixel datum 20 is divided in two parts and fed to both a pixel data register 92 and a comparator 93. The pixel datum 20 registered previously in the same pixel data register 92, i.e., outputted from the other pixel 19 located just to the left of the pixel 19 outputting said pixel datum 20 is simultaneously fed to this comparator 93, from which a balance datum 94 is outputted. This balance datum 94, which is in digital form, represents "1" only when there is some balance between said pixel datum 20 and the pixel datum 20 registered previously.

This balance datum 94 is fed together with the focus datum 91 to an AND circuit 95, from which the focus pixel datum 34 is outputted. This focus pixel datum 34 represents "1" when the two data represent "". In other words, this focus pixel datum 34 represents as "1" the pixel 19 in which the object point 21 within the depth of focus of the lens forms its image, and the pixel datum 20 corresponding to which is different from the one corresponding to the other pixel accessing to said pixel 19.

The constitution and operation of the above described embodiment of this invention can be modified in various ways without departing from the spirit of the invention as illustrated by the following examples.

1. The light entering through a lens 2 is divided into three light beams of three primary colors, and the image signals 6 obtained respectively from these light beams are processed in focus extraction sections B and coincidence sections C. The resulting measured ranges are finally combined.

2. In the coincidence section C, comparison is carried out with respect to a plurality of pixels 19 which have become aligned continuously or intermittently in the same direction on both CCDs 3. In the case where the pixel data 20 outputted from the pixels 19 whose relative positions are the same among these plurality of pixels 19 respectively coincide, and, moreover, at least one of the focus pixel data 34 with respect to these plurality of pixels 19 is "1", the coincidence datum 46 with respect to these plurality of pixels 19 becomes "1".

3. Instead of installing the electronic circuit described in the example of practice of this invention, a microcomputer and a soft program are used to accomplish an operation of equivalent functional result.

4. In the processing of the image signal 6 of an image having a relatively distinctive characteristic, the operation of the coincidence section C is carried out by seeking a pixel position datum as a signal indicating the position of a pixel 19 of varying pixel datum 20, irrespective of whether or not the image of an object point 21 within the scope of the focus is being formed, and using this pixel position datum and the corresponding standard image datum 36.

5. By operating elements constituting the optical system such as the lens 2 and a mirror in each camera 4, the interval distance 10 in the example illustrated in FIG. 1 or the camera angle 62 in the example shown in FIG. 3 is varied.

6. In an object 5, parts indicating variations of the same optical information are present in closely disposed state. For this reason, when pixel data 20 corresponding to different object points 21 are compared, the coincidence datum 46 becomes "1", and there is the possibility of the occurrence of error wherein two or more species of object ranges 42 are recorded in the same individual memories within the rang memory 51. In this case, since the correct object range 42 is not measured, it is desirable that the contents stored within the above mentioned individual memories be left erased.

I claim:

1. An apparatus for measuring ranges to points of an object comprising:
   (A) a pair of cameras, each having:
      a pair of lenses, each having an optical axis, and
      a pair of image sensing devices each of which is disposed at positions on each optical axis of each lens and each image sensing device having a plurality of light receiving elements which are aligned perpendicular to said optical axes to produce element analog signals indicative of radiation received thereon from said object points;
   (B) means for moving the position of the depth of focus of each camera;
   (C) a pair of signal processing circuits which convert said element analog signals to digital data;
   (D) a pair of focus extraction sections each of which includes a plurality of memories to store said digital data, a subtractor connected to each memory to provide contrasts between digital data which are fed from said light receiving elements aligned adjacent to each other, a plurality of comparators connected to receive a signal corresponding to an output of said subtractor to provide focus element data representing the contrasts of a peak value of said digital data and a plurality of coincidence circuits;
   (E) each coincidence circuit including
      one of said comparators to detect coincidence between one digital datum from one light receiving element in one image sensing device and other digital datum from another light receiving element in the other image sensing device, said two light receiving elements being displaced by a displacement distance, said displacement distance being variable,
      and an AND circuit to provide coincidence data to represent coincidence when said two focus element data are provided;
   (F) a range calculator responsive to said displacement distance for calculating range when said coincidence datum is provided;
   (G) a range memory for storing said ranges; and
   (H) a central processing unit for generating signals corresponding to said position of the depth of focus for providing same to said cameras, and said displacement distance for providing same to said cameras and said range calculator.

2. An apparatus according to claim 1, further comprising:
   (A) a pair of signal processing sections which convert said element analog signals to digital data and which measure high-frequency parts contained in said element analog signals; and
   (B) said pair of focus extraction sections including said plurality of memories to store said digital data and said high-frequency parts, and said plurality of comparators in each focus extraction section to provide focus element data to represent the high-frequency parts showing each peak value of said digital data, each of which provides digital data corresponding to said focus element data to said coincidence circuit.

3. An apparatus according to claim 1, wherein said pair of image sensing devices includes a pair of TCL sensors each of which has a plurality of pairs of photoelectric elements, which are disposed at corresponding positions to light receiving elements respectively, to produce pairs of element analog signals.

4. An apparatus for measuring ranges to points of object comprising:
   (A) a pair of cameras each having
      a pair of lenses, each having an optical axis, and
      a pair of image sensing devices each of which is disposed at positions on each optical axis of each lens and each image sensing device having a plurality of light receiving elements which are aligned perpendicular to said optical axes to produce element signals indicative of radiation received thereon from said object points;
   (B) means for moving the position of the depth of focus of each camera;
   (C) a pair of signal processing circuits which convert said element signals to digital data;
   (D) means for varying the interval distance between said pair of cameras;
   (E) a pair of focus extraction sections each of which includes a plurality of memories to store said digital data, a subtractor connected to each memory to provide contrasts between digital data whlich are fed from said light receiving elements aligned adjacent to each other, and a plurality of comparators to provide focus element data representing the contrasts of a peak value of said digital data, i.e., to represent the light receiving elements being in depth of focus;
   (F) each coincidence circuit including:
      one of said comparators to detect coincidence between one digital datum from one light receiving element in one image sensing device and other digital datum from another light receiving element in the other image sensing device, said elements displaced by a variable interval distance,
      and an AND circuit to provide coincidence data to represent coincidence when said two focus element data are provided;
   (G) a range calculator responsive to said interval distance for calculating range when said coincidence datum is provided;
   (H) a range memory for storing said ranges; and
   (I) a central processing unit which provides the position of the depth of focus to said cameras, and said interval distance to said cameras and said range calculator.

5. An apparatus according to claim 4, further comprising:
(A) a pair of signal processing sections which convert said element signals to digital data and which measure high-frequency parts contained in element signals; and
(B) said pair of focus extraction sections including said plurality of memories to store said digital data and said high-frequency parts, and said plurality of comparators in each focus extraction section to provide focus element data to represent the high-frequency parts showing each peak value of said digital data, each of which provides digital data corresponding to said focus element data to said coincidence circuit.

6. An apparatus according to claim 4, wherein said pair of image sensing devices includes a pair of TCL sensors each of which has a plurality of pairs of photoelectric elements, which are disposed at corresponding positions to light receiving elements respectively, to produce pairs of element signals.

7. An apparatus for measuring ranges to points of an object comprising:
(A) a pair of cameras each having:
a pair of lenses, each having an optical axis, and
a pair of image sensing devices each of which is disposed at positions on each optical axis of each lens and each image sensing device having a plurality of light receiving elements which are aligned perpendicular to said optical axes to produce element signals indicative of radiation received thereon from said object points;
(B) means for moving the position of the depth of focus of each camera;
(C) a pair of signal processing circuits which convert said element signals to digital data;
(D) means for varying the angle between said optical axes;
(E) a pair of focus extraction sections each of which includes a plurality of memories to store said digital data, a subtractor connected to each memory to provide contrasts between digital data which are fed from said light receiving elements aligned adjacent to each other, and a plurality of comparators to provide focus element data representing the contrasts of a peak value of said digital data;
(F) each coincidence circuit including:
one of said comparators to detect coincidence between one digital datum from one light receiving element in one image sensing device and other digital datum from another light receiving element in the other image sensing device,
and an AND circuit to provide coincidence data to represent coincidence when said two focus element data are provided;
(G) a range calculator responsive to said angle for calculating said range when salid coincidence datum is provided;
(H) a range memory for storing said ranges; and
(I) a central processing unit which provides said position of depth of focus to said cameras, and said angle to said cameras and said range calculator.

8. An apparatus according to claim 7, further comprising:
(A) a pair of signal processing sections which convert said element signals to digital data and which measure high-frequency parts contained in said element signals; and
(B) said pair of focus extraction sections including said plurality of memories to store said digital data and said high-frequency parts, and said plurality of comparators in each focus extraction section to provide focus element data to represent the high-frequency parts showing each peak value of said digital data,
each of which provides digital data corresponding to said focus element data to said coincidence section.

9. An apparatus according to claim 7, wherein said pair of image sensing devices includes a pair of TCL sensors each of which has a plurality of pairs of photoelectric elements, which are disposed at corresponding positions to light receiving elements respectively, to produce pairs of element signals.

10. An apparatus for measuring ranges to points of object comprising:
(A) a camera having
a lens having an optical axis, and
an image sensing device which has a plurality of light receiving elements which are aligned perpendicular to the optical axis of said lens to produce element signals indicative of radiation received on said light receiving elements from said object points;
(B) means for moving the position of the depth of focus of said camera;
(C) a signal processing circuit which converts said element signals to digital data;
(D) a focus extraction section which has a plurality of memories to store said digital data, a subtractor connected to each memory to provide contrasts between digital data which are fed from said light receiving elements aligned adjacent to each other, and a plurality of comparators to provide focus element data representing the contrasts of a peak value, i.e., to represent the light receiving elements being in depth of focus;
(E) a range calculator responsive to said position of depth of focus for calculating said range when said focus element datum is provided;
(F) a range memory for storing said ranges; and
(G) a central processing unit which provides the position of depth of focus to said camera and said range calculator.

11. An apparatus for measuring ranges to points of object comprising:
(A) a camera having
a lens having an optical axis, and
an image sensing device which has a plurality of light receiving elements which are aligned perpendicular to the optical axis of said lens to produce element signals indicative of radiation received on said light receiving elements from said object points;
(B) means for moving the position of the depth of focus of said camera;
(C) a signal processing section which measures high-frequency parts contained in said element signals;
(D) a focus extraction section which has a plurality of memories to store said high-frequency parts and a plurality of comparators to provide focus element data representing the high-frequency parts of a peak value, i.e., to represent the light receiving elements being in depth of focus;

(E) a range calculator responsive to said position of depth of focus for calculating said range when said focus element datum is provided;
(F) a range memory for storing said ranges; and
(G) a central processing unit which provides said depth of focus to said camera and said range calculator.

12. An apparatus for measuring ranges to points of object comprising:
(A) a camera having
a lens
and a TCL sensor which has a plurality of pairs of photoelectric elements to produce pairs of photoelectric data;
(B) means for moving the position of the depth of focus of said camera;
(C) a focus extraction section which has one comparator to provide focus element data to represent the pairs of photoelectric data of each same value, i.e., to represent the light receiving elements being in depth of focus;
(D) a range calculator to be fed with said depth of focus for calculating said range when said focus element datum is provided;
(E) a range memory for storing said ranges; and
(F) a central processing unit which provides said position of depth of focus to said camera and said range calculator.

* * * * *